(12) United States Patent
Doerr

(10) Patent No.: US 6,658,174 B2
(45) Date of Patent: Dec. 2, 2003

(54) PUSH-PULL THERMO-OPTIC SWITCH

(75) Inventor: Christopher Richard Doerr, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 412 days.

(21) Appl. No.: 09/810,135

(22) Filed: Mar. 16, 2001

(65) Prior Publication Data
US 2002/0131710 A1 Sep. 19, 2002

(51) Int. Cl.[7] .............................. G02B 6/28; G02B 6/26; G02B 6/42
(52) U.S. Cl. .............................. 385/16; 385/24; 385/39; 385/140
(58) Field of Search ............................ 385/9–10, 15–16, 385/24, 39, 140, 31, 32, 33; 398/48, 79, 82

(56) References Cited

PUBLICATIONS

Masayuki Okuno et al., "Silica–Based Thermo–Optic Switches", *NTT Review*, vol. 7, No. 5, Sep. 1995, pp. 57–63.

*Primary Examiner*—Frank G. Font
*Assistant Examiner*—Michael P. Mooney
(74) *Attorney, Agent, or Firm*—Barry H. Freedman; David A. Sasso

(57) ABSTRACT

A thermo-optic interferometer switch is arranged to operate in a Push-pull mode by placing approximately a quarter-wavelength effective path-length difference (90 degree bias) between the arms of an interferometer switch in the zero-drive state, and then driving one arm to activate the switch to one state (e.g., the bar state), and driving the other arm to go to the other state (e.g. the cross state).

6 Claims, 1 Drawing Sheet

CONVENTIONAL THERMO-OPTIC MACH-ZEHNDER INTERFEROMETER SWITCH.
PRIOR ART

PUSH-PULL THERMO-OPTIC MACH-ZEHNDER INTERFEROMETER SWITCH.

PUSH-PULL THERMO-OPTIC SWITCH

FIELD OF THE INVENTION

This invention relates generally to optical communication devices and arrangements, and, in particular, to an improved push-pull arrangement for a thermo-optic switch.

BACKGROUND OF THE INVENTION

Wavelength Division Multiplexing (WDM) control devices, such as wavelength add-drops (WADs), wavelength selective cross connects (WSCs), and dynamic gain equalization filters (DGEFs), often consist of a demultiplexer and a multiplexer connected by an array of switches. A low-loss, compact, mass-produceable way to make the switches is to use a planar arrangement of thermo-optic Mach-Zehnder (M-Z) interferometer switches in silica waveguides.

The conventional way to make the switch, as described, for example, in M. Okuno, N. Takato, T. Kitoh, and A. Sugita, "Silica-based thermo-optic switches," NTT Review, vol. 7, no. 5, pp. 57–63, 1995, is to place a thermo-optic phase shifter 110 in one arm 101 of the interferometer, as shown in FIG. 1. A thermo-optic phase shifter is simply a heater deposited over the waveguide that causes the refractive index of the waveguide material to change via a temperature change when electrical current is sent through the heater. Usually the two path lengths (i.e., the lengths of arms 101 and 102) between the input coupler 120 and the output coupler 130 are designed to be equal when the thermo-optic phase shifter is undriven, although sometimes there is a half-wavelength bias.

The conventional arrangement has several drawbacks. The power consumption is high, the total power dissipated changes with the number of activated switches leading to temperature control problems, the polarization dependence is significant, and the phase changes when the switch state is changed.

SUMMARY OF THE INVENTION

All four of the problems just described can be mitigated by changing the thermo-optic interferometer switch to become push-pull, by placing approximately a quarter-wavelength effective path-length difference (90 degree bias) between the arms of an interferometer switch in the zero-drive state, and then driving one arm to activate the switch to one state (e.g., the bar state) and driving the other arm to go to the other state (e.g., the cross state).

BRIEF DESCRIPTION OF THE DRAWING

The present invention will be fully appreciated by consideration of the following Detailed Description, which should be read in light of the accompanying drawing in which.

DETAILED DESCRIPTION

Figure 1:
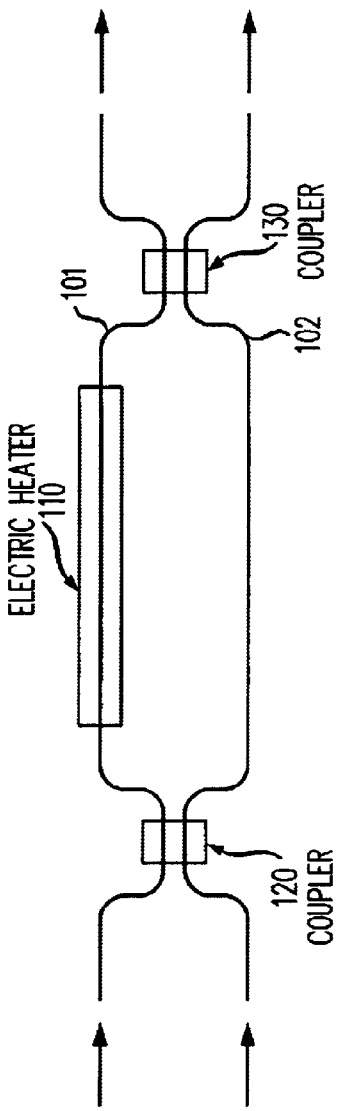
FIG. 1. is a diagram illustrating the arrangement of a prior art thermo-optic Mach-Zehnder interferometer switch.
Figure 2:
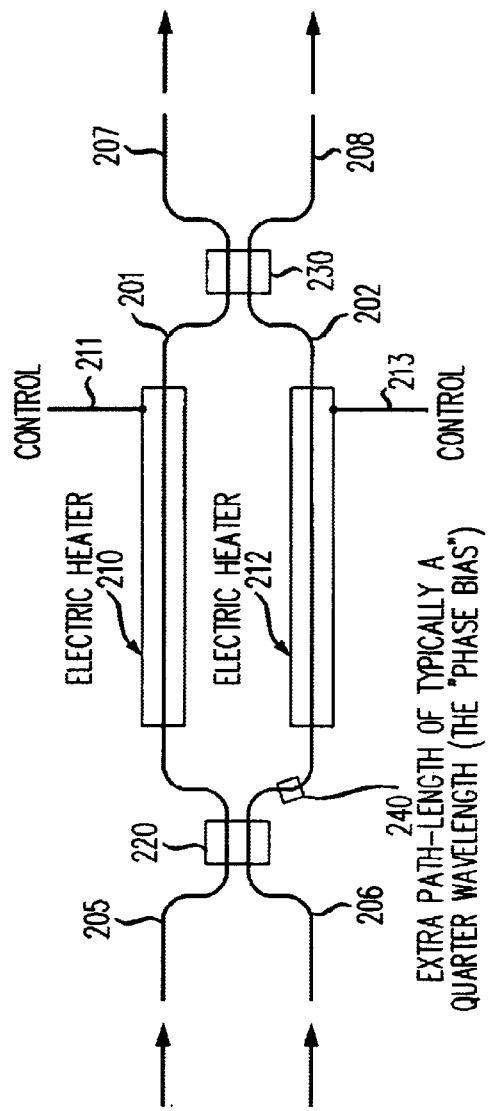
FIG. 2. is a diagram illustrating the arrangement of a push-pull thermo-optic Mach-Zehnder interferometer switch in accordance with the present invention.

Referring now to FIG. 2, there is shown a diagram illustrating the arrangement of a push-pull thermo-optic Mach-Zehnder interferometer switch for switching or attenuating optical signals in accordance with the present invention. One or two input waveguides, such as waveguides 205, 206, are connected to a first coupler 220 that connects the optical signal to two waveguides or paths 201, 202 that advantageously have a path-length difference between one eighth and three eighths of an optical wavelength. This path length difference can be obtained, for example, by including an "extra" path length, shown illustratively as element 240 in FIG. 2, in path 202. Waveguides or paths 201, 202 are connected to a second coupler 230, that in turn couples the coupler outputs to one or two output waveguides, such as waveguides 207, 208. In accordance with the invention, two electric heaters 210, 212 are disposed, one on each of the waveguides 201, 202. The heaters 210, 212 are both driven, not necessarily simultaneously, by electrical control signals received on control inputs 211 and 213, respectively, to control the optical transmissivity through the device in such a manner that one arm is driven or switched to one state, and the other arm is driven or switched to the other state. In this way, the overall device operates in a push-pull mode.

There are many benefits of push-pull thermo-optic switches, including reduced power consumption, constant power dissipation, reduced polarization dependence and constant phase. For a thermo-optic switch, the electric power consumed is proportional to the applied phase shift. To switch a conventional M-Z switch, 180 degrees of phase shift is required, while to switch a push-pull MZ switch, only 90 degrees of phase shift is required, depending on the exact path-length bias applied to the switch. Thus the power consumption is reduced by up to a factor of two.

In a conventional MZ switch, the switch dissipates zero power in one state and significant power in the other state. For a device containing an array of switches, this can lead to temperature control problems, since it may happen that in one state many switches are dissipating no power, and in another state many switches are dissipating significant power, heating up the substrate.

For a push-pull switch, the total power dissipated can be constant. One can simply keep the total drive power to both phase shifters of the MZ switch constant, and just change the ratio between the two drive powers to change the state of the switch. For example, if the phase bias is 90 degrees, then one heater is driven for one switch state, and the other heater is driven for the other switch state. For intermediate switch states, both heaters can be driven with a variable ratio between them, but a total drive power that is constant. Of course, if one does not care about having a constant power consumption nor a constant phase, one could drive just one heater at a time for the intermediate switch states.

In thermo-optic phase shifters the phase shift per amount of electrical drive power is typically different for the two light polarizations. It is typically 6.5% higher for transverse magnetically polarized light. So in a conventional M-Z switch, polarization dependence is zero in one switch state and significant in the other switch state.

In a push-pull MZ, there is polarization dependence in both switch states, but it is significantly smaller than the worst case of the conventional M-Z switch. If one is using intermediate switch states to do, for example, dynamic optical attenuation, then for typical thermo-optic phase shifters, the worst-case polarization dependence is achieved by a phase bias of ~130 degrees. Thus, one might wish to have a path-length bias between one eighth and three eighths of a wavelength.

If the M-Z switches are in an interferometer, then one may care about the phase change in the switch. In a conventional M-Z switch, both the amplitude and phase of the light changes as the switch state is changed. However, in a push-pull switch, only the amplitude of the light changes, and the phase stays constant.

Various modifications of this invention will occur to those skilled in the art. Nevertheless, all deviations from the specific teachings of this specification that basically rely upon the principles and their equivalents through which the art has been advanced are properly considered within the scope of the invention as described and claimed.

I claim:

1. An optical device for switching or attenuating optical signals comprising:

at least one input waveguide arranged to provide an input optical signal to a first coupler having first and second outputs;

first and second waveguides arranged to receive said first and second outputs of said first coupler, said first and second waveguides having a path-length difference between approximately one-eighth and three-eighths of an optical wavelength;

a second coupler arranged to couple the outputs of said first and second waveguides to at least one output waveguide, characterized in that first and second electric heaters are disposed on said first and second waveguides, respectively, and driven to control the optical transmissivity through said optical device.

2. The optical device according to claim 1, wherein the first and second electric heaters are driven to operate said device in a push-pull mode.

3. The optical device according to claim 1, wherein the path-length difference is substantially equal to a quarter wavelength.

4. The optical device according to claim 1, wherein the waveguide material is silica.

5. A device for processing an optical signal comprising:

a first coupler arranged to direct said optical signal to at least a first and a second output;

first and second waveguides in optical communication with said first and second outputs of said first coupler;

first and second electric heaters disposed on said first and second waveguides respectively, and an electrical control input to said heaters arranged to control the optical transmissivity of said device;

said first and second waveguides having a path-length difference such that one or more outputs of the device each contain approximately half of the optical signal with no electrical control input applied to said heaters; and a second coupler arranged to direct the combined outputs of said first and second waveguides to at least one output waveguide.

6. A push-pull thermo-optic interferometer switch arrangement comprising first and second interferometer arms, one of said interferometer arms including approximately a quarter-wavelength effective path-length difference as compared to the other of said interferometer arms when said interferometer is in the zero-drive state, and thermo-electric means arranged to activate said switch by driving optical signals in one of said interferometer arms to the bar state and optical signals in the other of said interferometer arms to the cross state.

* * * * *